(12) United States Patent
Lindsey et al.

(10) Patent No.: US 9,075,895 B2
(45) Date of Patent: Jul. 7, 2015

(54) CASE DATA VISUALIZATION APPLICATION

(75) Inventors: Teddy Lindsey, San Diego, CA (US); Michael Dickun, Solana Beach, CA (US)

(73) Assignee: NTREPID CORPORATION, Herndon, VA (US)

( * ) Notice: Subject to any disclaimer, the term of this patent is extended or adjusted under 35 U.S.C. 154(b) by 106 days.

(21) Appl. No.: 13/517,814

(22) Filed: Jun. 14, 2012

(65) Prior Publication Data

US 2013/0339391 A1    Dec. 19, 2013

(51) Int. Cl.
*G06F 17/30* (2006.01)
*G06Q 10/06* (2012.01)

(52) U.S. Cl.
CPC .... *G06F 17/30949* (2013.01); *G06F 17/30551* (2013.01); *G06Q 10/06* (2013.01)

(58) Field of Classification Search
USPC ........................................................ 707/792
See application file for complete search history.

(56) References Cited

U.S. PATENT DOCUMENTS

| | | | |
|---|---|---|---|
| 5,581,686 A | 12/1996 | Koppolu et al. | |
| 5,717,869 A | 2/1998 | Moran et al. | |
| 6,366,299 B1 | 4/2002 | Lanning et al. | |
| 6,996,782 B2 | 2/2006 | Parker et al. | |
| 7,139,983 B2 | 11/2006 | Kelts | |
| 7,278,111 B2 | 10/2007 | Stata et al. | |
| 7,415,662 B2 | 8/2008 | Rothmuller et al. | |
| 7,523,191 B1 | 4/2009 | Thomas et al. | |
| 7,536,650 B1 | 5/2009 | Robertson et al. | |
| 7,644,364 B2 | 1/2010 | Patten et al. | |
| 7,774,716 B2 | 8/2010 | Crain et al. | |
| 7,818,683 B2 | 10/2010 | Sorin et al. | |
| 7,831,586 B2 | 11/2010 | Reitter et al. | |
| 7,966,150 B2 | 6/2011 | Smtih et al. | |
| 8,453,086 B2 | 5/2013 | Tung et al. | |
| 8,560,946 B2 | 10/2013 | Fugitt et al. | |
| 2004/0003247 A1* | 1/2004 | Fraser et al. | 713/169 |
| 2004/0012633 A1 | 1/2004 | Helt | |
| 2005/0278052 A1* | 12/2005 | Bett et al. | 700/108 |
| 2006/0153445 A1 | 7/2006 | Lin | |
| 2006/0156245 A1 | 7/2006 | Williams et al. | |
| 2008/0221987 A1 | 9/2008 | Sundaresan et al. | |
| 2008/0294663 A1 | 11/2008 | Heinley et al. | |
| 2008/0307323 A1* | 12/2008 | Coffman et al. | 715/753 |

(Continued)

OTHER PUBLICATIONS

"LexisNexis CaseMap Quick Start Tutorial" Jan. 1, 2010, pp. 1-24.

(Continued)

*Primary Examiner* — Rehana Perveen
*Assistant Examiner* — Alexander Khong
(74) *Attorney, Agent, or Firm* — Squire Patton Boggs (US) LLP

(57) ABSTRACT

A case data visualization application is provided that, when executed on a device, allows a user to visualize a chronology of events associated with a case, view a summary of one or more supporting details of an event, and drill-down to view specific case data of each supporting detail of an event. Thus, the case data visualization application provides a way of collecting, organizing, visualizing, and sharing data associated with a case. Furthermore, the case data visualization application allow a plurality of users to collaborate on the case, and synchronizes a plurality of supporting details created by a plurality of users that are associated with an event.

36 Claims, 10 Drawing Sheets

(56) References Cited

U.S. PATENT DOCUMENTS

| | | |
|---|---|---|
| 2009/0241048 A1 | 9/2009 | Augustine et al. |
| 2009/0327733 A1* | 12/2009 | McDougal et al. ............ 713/176 |
| 2010/0121934 A1* | 5/2010 | Guntupalli et al. ............ 709/207 |
| 2010/0262901 A1 | 10/2010 | DiSalvo |
| 2011/0078571 A1 | 3/2011 | Asbahr et al. |
| 2011/0185280 A1 | 7/2011 | Nakash et al. |
| 2012/0117479 A1 | 5/2012 | Kembel et al. |
| 2012/0210220 A1* | 8/2012 | Pendergast et al. ............ 715/716 |
| 2012/0254136 A1* | 10/2012 | Bosson ......................... 707/699 |
| 2012/0272153 A1 | 10/2012 | Grossman et al. |
| 2013/0110543 A1* | 5/2013 | Leighow et al. ................. 705/3 |
| 2013/0271456 A1* | 10/2013 | Haswell et al. ............... 345/420 |

OTHER PUBLICATIONS

Deniz Aktug et al., "Signature File Hashing Using Term Occurrence and Query Frequencies", IEEE 1993, pp. 148-153.

LexisNexis, "TimeMap Transforms Timeline Graphing", Jan. 1, 2006, 8 pages.

European Search Report application No. 13171861.1 dated Nov. 8, 2013.

* cited by examiner

| Show: | All | Attached | Unattached | View: | Normal | Forensic | | |
|---|---|---|---|---|---|---|---|---|
| File Name | | | | Events | Size | Create Date | | |
| File1.txt | | | | 3 | 12 bytes | 01-01-1998 | | |
| File 2.doc | | | | 1 | 100 bytes | 01-01-2010 | | |
| File3.jpg | | | | 5 | 252 bytes | 01-01-2005 | | |

File Library User Interface 600

Fig. 6

CASE DATA VISUALIZATION APPLICATION

BACKGROUND

1. Field

Certain embodiments of the invention relate generally to computer systems. More specifically, certain embodiments of the present invention relate to computer systems that provide one or more software applications utilized in collecting, organization, visualizing, and sharing of data.

2. Description of the Related Art

Individuals across a range of fields, such as law enforcement, scientific research, historical research, litigation and insurance, are required to collect and organize a significant amount of data as part of their day-to-day workloads. Such individuals are generally required to organize and present this collected data (such as presenting a case against a defendant or presenting results of experiments to colleagues). However, it is generally difficult to build a logical, time-oriented narrative based on the collected data, as the collected data is generally from numerous different sources, and generally in numerous different formats. Furthermore, conventional tools are generally not set up to facilitate creating such a narrative. For example, enterprise resource planning (ERP) case management software is generally too unwieldy to facilitate a logical, time-oriented narrative. Furthermore, the use of ERP case management software can raise issues as to the portability of sensitive data, or the portability of data that is tied to the ERP case management software, and not easily transferred into another format.

SUMMARY

According to an embodiment of the invention, a method includes displaying a timeline that includes one or more events associated with a case, where the one or more events are displayed within the timeline in a chronological order, and where at least one event includes case data. The method further includes creating a new event that is associated with the case. The method further includes receiving one or more files, where at least one file includes new case data. The method further includes encapsulating the one or more files within a case file. The method further includes displaying the new event within the timeline, where the displayed new event includes a link to the case file, and where the link to the case file causes the new case data to be displayed within the timeline.

According to another embodiment, an apparatus includes a memory configured to store a case data visualization module. The apparatus further includes a processor configured to execute the case data visualization module stored on the memory. The processor is further configured, when executing the case data visualization module stored on the memory, to, display a timeline that includes one or more events associated with a case, where the one or more events are displayed within the timeline in a chronological order, and where at least one event includes case data. The processor is further configured, when executing the case data visualization module stored on the memory, to, create a new event that is associated with the case. The processor is further configured, when executing the case data visualization module stored on the memory, to, receive one or more files, where at least one file includes new case data. The processor is further configured, when executing the case data visualization module stored on the memory, to, encapsulate the one or more files within a case file. The processor is further configured, when executing the case data visualization module stored on the memory, to, display the new event within the timeline, where the displayed new event includes a link to the case file, and wherein the link to the case file causes the new case data to be displayed within the timeline.

According to another embodiment, a non-transitory computer-readable medium includes a computer program stored thereon that, when executed by a processor, causes the processor to implement a method. The method includes displaying a timeline that includes one or more events associated with a case, where the one or more events are displayed within the timeline in a chronological order, and where at least one event includes case data. The method further includes creating a new event that is associated with the case. The method further includes receiving one or more files, where at least one file includes new case data. The method further includes encapsulating the one or more files within a case file. The method further includes displaying the new event within the timeline, where the displayed new event includes a link to the case file, and where the link to the case file causes the new case data to be displayed within the timeline.

According to another embodiment of the invention, a method includes receiving a first set of case data associated with a case, where the first set of case data includes a first set of events associated with the case. The method further includes comparing the first set of case data with a second set of case data associated with the case, where the second set of case data includes a second set of events associated with the case. The method further includes reconciling one or more differences between the first set of case data with the second set of case data.

According to another embodiment, an apparatus includes a memory configured to store a case data visualization module. The apparatus further includes a processor configured to execute the case data visualization module stored on the memory. The processor is further configured, when executing the case data visualization module stored on the memory, to, receive a first set of case data associated with a case, where the first set of case data includes a first set of events associated with the case. The processor is further configured, when executing the case data visualization module stored on the memory, to, compare the first set of case data with a second set of case data associated with the case, where the second set of case data includes a second set of events associated with the case. The processor is further configured, when executing the case data visualization module stored on the memory, to reconcile one or more differences between the first set of case data with the second set of case data.

According to another embodiment, a non-transitory computer-readable medium includes a computer program stored thereon that, when executed by a processor, causes the processor to implement a method. The method includes receiving a first set of case data associated with a case, where the first set of case data includes a first set of events associated with the case. The method further includes comparing the first set of case data with a second set of case data associated with the case, where the second set of case data includes a second set of events associated with the case. The method further includes reconciling one or more differences between the first set of case data with the second set of case data.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein:

FIG. 6 illustrates an example file library user interface of a case data visualization module, according to an embodiment of the invention.

DETAILED DESCRIPTION

Figure 1:
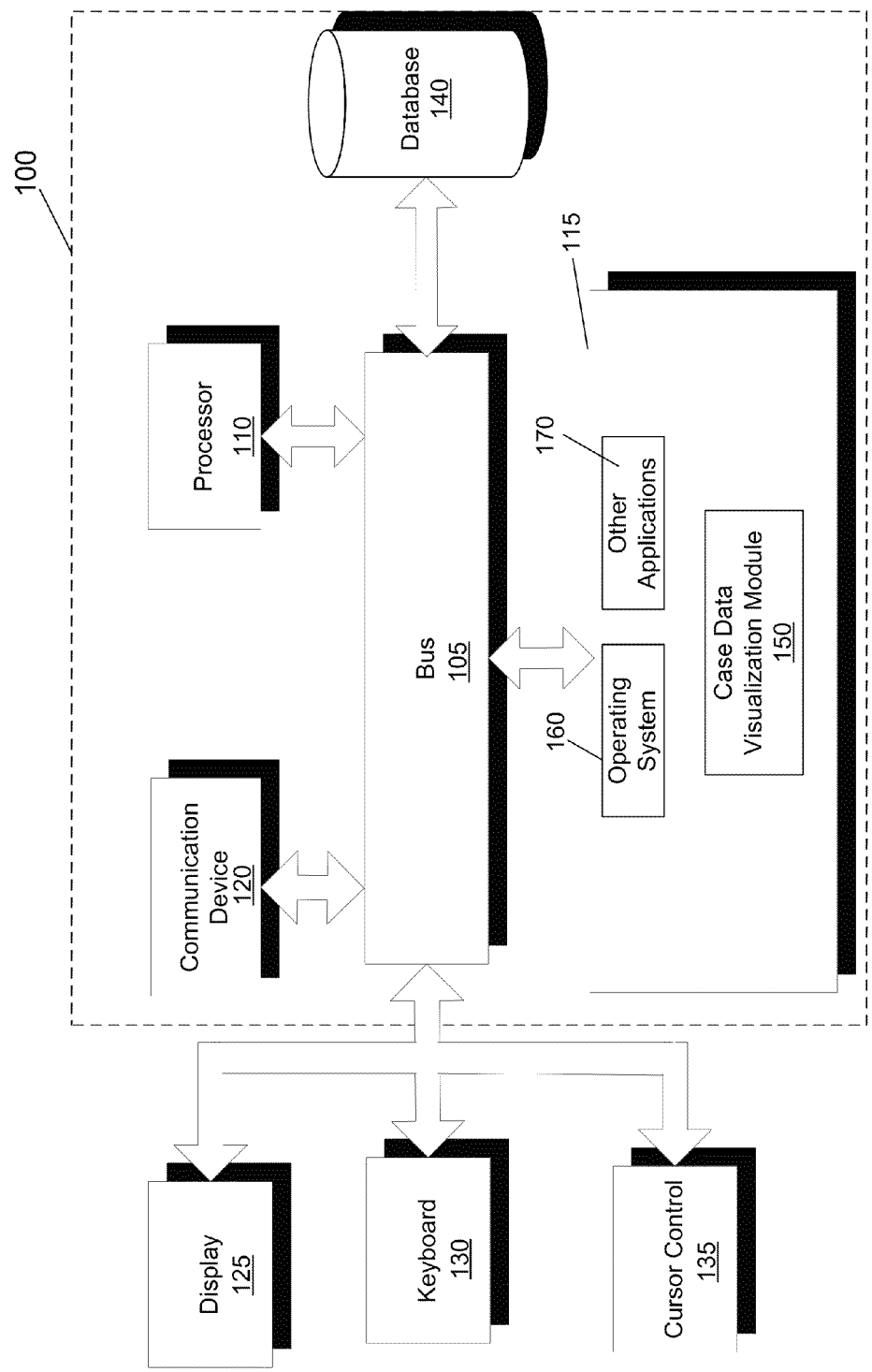
FIG. 1 illustrates a block diagram of an apparatus in accordance with an embodiment of the invention.

It will be readily understood that the components of the present invention, as generally described and illustrated in the figures herein, may be arranged and designed in a wide variety of different configurations. Thus, the following detailed description of the embodiments of a method, apparatus, system, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

DEFINITIONS

A "computer," as understood by one of ordinary skill in the art, is any programmable machine that receives input, automatically stores and manipulates data, and provides output. A "physical machine" or "physical computer" is a hardware implementation of a machine or computer, where the machine or computer includes a hardware component. A "virtual machine" or "virtual computer" is a software implementation of a machine or computer that executes programs like a physical machine or computer, but where the software implementation does not include a hardware component outside of the physical machine or computer that the virtual machine or computer executes upon.

A "computer program" is any sequence of instructions written to perform a specific task on a computer, and has an executable form that a computer (typically through the use of a processor) can use to execute the instructions. A "computer module," "software module," or "module" is any computer program, or a portion thereof, that encapsulates related functions. A "computer application," "software application," or "application" is any collection of computer programs and/or modules. A "computer network" or "network" is any collection of computers interconnected by communication channels that facilitate communication among the computers. A "file" is a resource that stores data that can be accessed by a computer program that is executed within the computer. A "case" is an actual event, situation, or fact, such as a legal proceeding (such as a prosecution of a criminal defendant), a medical proceeding involving an instance of a specific condition or set of symptoms and a medical examination of the condition or symptoms, or a unit of work for a specific profession.

Case Data Visualization Application

According to an embodiment of the invention, a software application (identified as a "case data visualization application") can be provided that, when executed on a device, allows a user to visualize a chronology of events associated with a case (such as a prosecution of a criminal defendant, a medical examination of a specific condition, or set of symptoms, or a unit of work for a specific profession), view a summary of one or more supporting details (such as documents or files) of an event, and drill-down to view specific case data of each supporting detail of an event, in one cohesive software application. Thus, the case data visualization application can provide a way of collecting, organizing, visualizing, and sharing data associated with a case. The case data visualization application can provide a framework that allows for multiple view types for visualizing a case, including a timeline view of the case, a spatial map view of the case, a tabular grid view of the case, and a relational link chart view of the case. Furthermore, the case data visualization application can allow a plurality of users to collaborate on the case, and can synchronize a plurality of supporting details created by a plurality of users that are associated with an event. The case data visualization application can be implemented on any device, such as a client or server.

FIG. 1 illustrates a block diagram of an apparatus 100 in accordance with an embodiment of the invention. As is described below in greater detail, in certain embodiments, apparatus 100 can be a client. As is also described below in greater detail, in other embodiments, apparatus 100 can be a server.

According to the embodiment, apparatus 100 includes a bus 105 or other communications mechanism for communicating information between components of apparatus 100. Apparatus 100 also includes a processor 110, operatively coupled to bus 105, for processing information and executing instructions or operations. Processor 110 may be any type of general or specific purpose processor. Apparatus 100 further includes a memory 115 for storing information and instructions to be executed by processor 110. Memory 115 can include any combination of random access memory (RAM), read only memory (ROM), static storage such as a magnetic or optical disk, or any other type of machine or computer-readable medium. Apparatus 100 further includes a communication device 120, such as a network interface card or other communications interface, to provide access to a network. As a result, a user may interface with apparatus 100 directly, or remotely through a network or any other method.

A computer-readable medium may be any available medium that can be accessed by processor 110. A computer-readable medium may include both a volatile and nonvolatile medium, a removable and non-removable medium, and a storage medium. A storage medium may include RAM, flash memory, ROM, erasable programmable read-only memory (EPROM), electrically erasable programmable read-only memory (EEPROM), registers, hard disk, a removable disk, a compact disk read-only memory (CD-ROM), or any other form of storage medium known in the art.

Processor 110 can also be operatively coupled via bus 105 to a display 125, such as a Liquid Crystal Display (LCD). Display 125 can display information to the user. A keyboard 130 and a cursor control device 135, such as a computer mouse, can also be operatively coupled to bus 105 to enable the user to interface with apparatus 100.

Processor 110 can also be operatively coupled via bus 105 to a database 140. Database 140 can store data in an integrated collection of logically-related records or files. Database 140 can be an operational database, an analytical database, a data warehouse, a distributed database, an end-user database, an external database, a navigational database, an in-memory database, a document-oriented database, a real-time database, a relational database, an object-oriented database, a NoSQL database, or any other database known in the art. In certain embodiments, where apparatus 100 is a client, database 140 can be an embedded relational database, such as a SQLite database. In certain embodiments, where apparatus 100 is a server, database 140 can be a NoSQL database, such as a MongoDB database.

According to one embodiment, memory 115 can store software modules that may provide functionality when executed by processor 110. The modules can include case data visualization module 150. Case data visualization module 150 can provide a case data visualization application that can collect, organize, synchronize, and display case data, as is described below in greater detail. In certain embodiments, case data visualization module 150 can comprise a plurality of modules that each provide specific individual functionality for collecting, organizing, synchronizing, and displaying case data.

According to the embodiment, memory 115 can also store operating system 160. Operating system 160 can provide an operating system functionality for apparatus 100. In one embodiment, apparatus 100 can also be part of a larger system. Thus, memory 115 can also store one or more additional applications 170 to include additional functionality for an overall system that apparatus 100 can be a part of.

Figure 2:
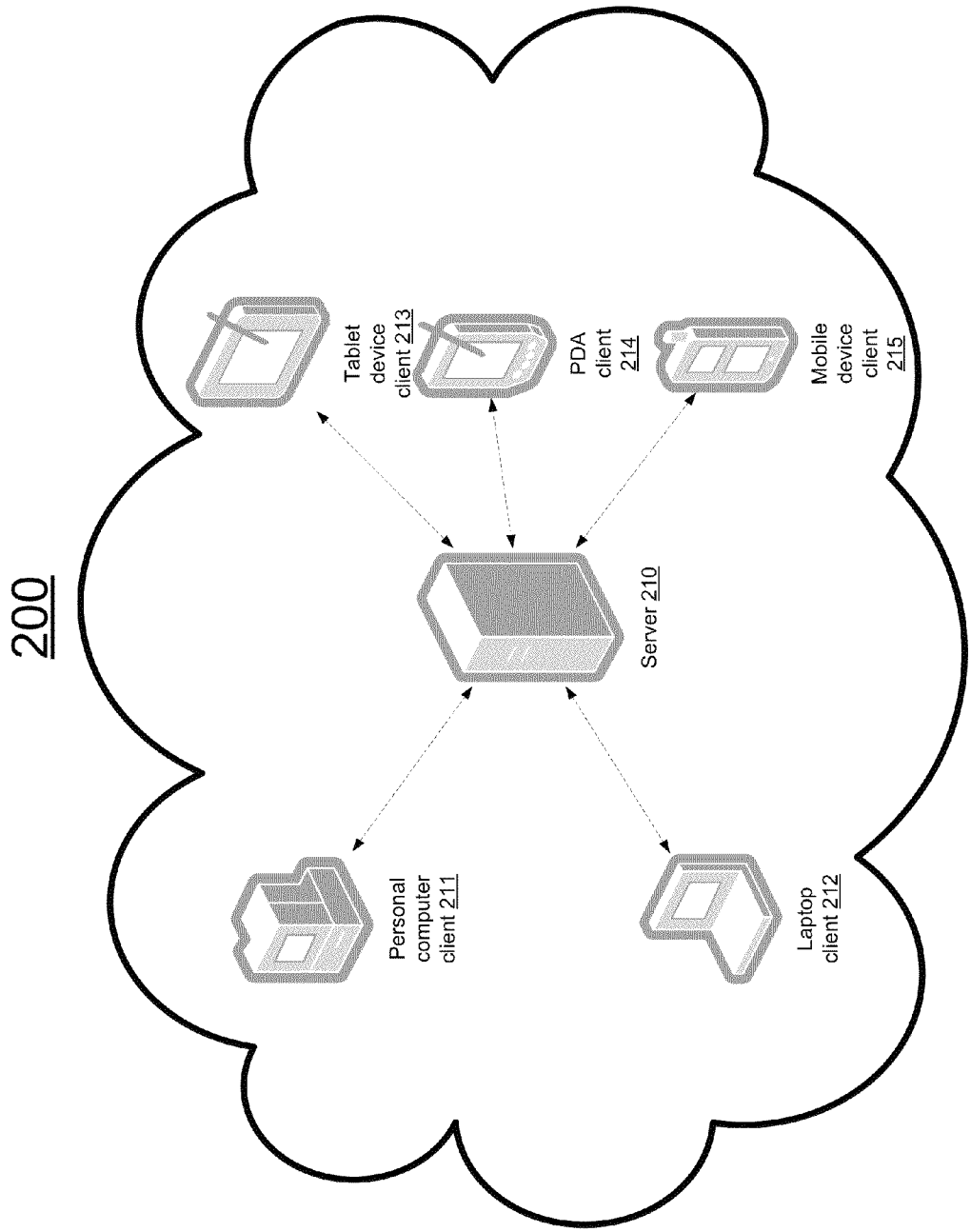
FIG. 2 illustrates a block diagram of a system in accordance with an embodiment of the invention.

FIG. 2 illustrates a block diagram of a system 200, according to an embodiment of the invention. System 200 includes server 210. Server 210 can be any computer system or software application that provides a service. Server 210 can be any type of server configured to synchronize case data, as is described below in greater detail, where examples of server 210 include any kind of application server, or any kind of web server. In certain embodiments, server 210 can be identical to apparatus 100 of FIG. 1. In alternate embodiments, server 210 can represent a distributed software-as-a-service (SaaS) solution that comprises a plurality of servers. In any of these embodiments, server 210 can utilize a case data visualization module (such as case data visualization module 150 of FIG. 1) to provide a case data visualization application that can synchronize case data, as is described below in greater detail.

System 200 also includes one or more clients, such as personal computer client 211, laptop client 212, tablet device client 213, personal digital assistant (PDA) client 214, and mobile device client 215, where a client can be can be any computer system or software application that accesses a service on a remote computer system, such as a personal computer, a laptop computer, a tablet computer, a PDA, and a mobile device. A client, such as personal computer client 211, laptop client 212, tablet device client 213, personal digital assistant (PDA) client 214, and mobile device client 215, can be configured to collect, organize, and display case data, as is described below in greater detail. In certain embodiments, a client, such as personal computer client 211, laptop client 212, tablet device client 213, PDA client 214, or mobile device client 215, can be identical to apparatus 100 of FIG. 1. In these embodiments, the client can utilize a case data visualization module (such as case data visualization module 150 of FIG. 1) to provide a case data visualization application that can collect, organize, and display case data, as is described below in greater detail. Furthermore, the client can utilize a case data visualization module (such as case data visualization module 150 of FIG. 1) to collect case data, encrypt the collected case data, and transmit the encrypted case data to another client, as is also described below in great detail.

One of ordinary skill in the art would readily understand that system 200 is an example configuration of a system according to an embodiment, and that, in other alternate embodiments, a system may have a different configuration. For example, a system may have any number of servers, and any number of clients, where each client may by any type of client, such as the types of client illustrated in FIG. 2. Furthermore, a system may also have additional types of devices not illustrated in FIG. 2.

In certain embodiments, a case data visualization module, such as (such as case data visualization module 150 of FIG. 1) can provide a case data visualization application that can be one of four formats: a client format, a reader format, a mobile format, and a server format. The four formats of a case data visualization application are further described in greater detail.

In certain embodiments, where the case data visualization application is a client format, the case data visualization application can be implemented on any type of client device, such as the client devices illustrated in FIG. 2 (i.e., personal computer client 211, laptop client 212, tablet device client 213, PDA client 214, and mobile device client 215). The case data visualization application can also be implemented on any computer platform, such as Microsoft Windows®, Apple Mac OS®, and Linux.

Figure 3:
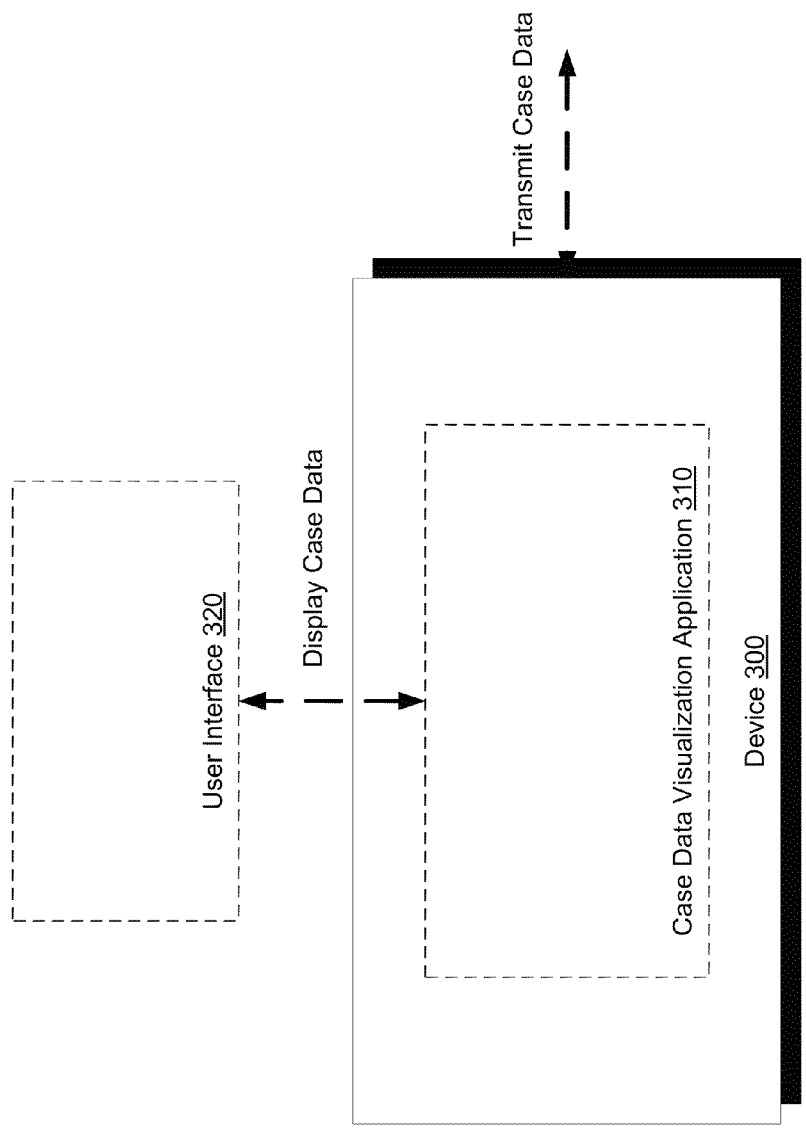
FIG. 3 illustrates a block diagram of a case data visualization application in a client format in accordance with an embodiment of the invention.

FIG. 3 illustrates a block diagram of a case data visualization application in a client format in accordance with an embodiment of the invention. According to the embodiment, a device 300 can include a case data visualization application 310 that is a client format, where the case data visualization application 310 is implemented on device 300.

According to the embodiment, case data visualization application 310 can encapsulate case data (such as images, scanned documents, visualizations, and other files) associated with a case. Such a case can include a criminal prosecution of a defendant, for example. As another example, such a case can include the provision of health care to a patient, the provision of legal services to a client, or any unit of work for a given profession. Cases are not limited to these examples, and can include any type of case that generates case data. Case data visualization application 310 can encapsulate the case data into a case file. A case file is a file that is associated with a case, that has a specifically defined format, and that includes case data. All case files that can be associated with a case can each have the same specifically defined format, and thus, all case files can have a universal format. In one embodiment, the case files can have a SQLite format.

In certain embodiments, the case data can be stored in one or more files, and case data visualization application 310 can receive the one or more files and encapsulate the one or more files into the case file. For example, case data visualization application 310 can display user interface 320 that allows a user to select one or more files that are stored on device 300 (where device 300 also stores case data visualization application 310). In certain embodiments, user interface 320 also allows the user to select a folder that is stored on device 300, where the folder includes one or more files.

In certain embodiments, case data visualization application 310 can automatically forensically hash each file of the one or more files before encapsulating each file into the case file. As one of ordinary skill in the art would readily appreciate, forensically hashing refers to hashing data to produce a digital signature and embedding the digital signature within the data to verify that the data has not been altered. The forensic hashes can be generated using a hashing algorithm (such as a MD5 message-digest algorithm ("MD5")). According to these embodiments, each file is forensically hashed upon collection. In certain embodiments, case data visualization application 310 can determine that a received file is identical to a file that has already been received and encapsulated into a case file. In these embodiments, rather than encapsulating the received file into the case file a second time, case data visualization application 310 can create metadata that references the file that has already been received, and can encapsulate the metadata, rather than the received file, within the case file. In certain embodiments, case data visualization application 310 can encrypt the case file. Also, in certain embodiments, case data visualization application 310 can store the case file within a database that is stored on device 300 (where device 300 also stores case data visualization application 310). In certain embodiments, the database is a SQLite database.

After receiving the one or more files, and encapsulating them into the case file, case data visualization application 310 can then generate a timeline visualization of the case data, and display the timeline visualization of the case data within user interface 320. An example of such a user interface is described in further detail in relation to FIG. 5.

In certain embodiments, a user can create a new event within user interface 320 of case data visualization application 310 by "clicking" on the timeline visualization. According to the embodiments, an "event" is a representation of case data associated with a point in time, or a duration is time, where the event can be visually represented within user interface 320. An event can take on one of many visual representations, including a block or a milestone. The user can also associate summary information to the event, such as a date and/or time, or a title, by entering the summary information within user interface 320. The user can also associate one or more files to the event, where the one or more files each include case data, by selecting the one or more files (or a folder that contains the one or more files) that can be displayed within user interface 320. In response to the selection, case data visualization application 310 can then receive the one or more files and encapsulate the one or more files within a case file.

In certain embodiments, an event can be associated with one or more tags. A tag is a short word or phrase that can be assigned to an event that identifies a category that the event is associated with. According to these embodiments, tagging can be the primary way to organize the one or more events associated with a case. In accordance with the embodiment, an event can have one or more tags associated with it. Because an event can have more than one tag associated with it, an event, and the case data contained within the event, can be organized into multiple categories. One type of tag is a predefined tag. This type of tag can be created by a system administrator of case data visualization application 310, and the text of the predefined tag can be defined when the predefined tag is created. A user can use a predefined tag in order to provide a standard way of categorizing events. Another type of tag is a regular tag. This type of tag can be created by a user, and the user can define the text of the regular tag when the user creates the tag. A user can use a regular tag in order to customize how the user indexes one or more events.

In certain embodiments, an event can be full-text indexed. As one of ordinary skill in the art would readily appreciate, full-text indexing refers to creating one or more indexes for case data that contains text, where each index of the one or more indexes corresponds to a word contained within the text, so that the case data is searchable. Thus, by full-text indexing an event, one or more indexes can be created for the case data included within the event, where the case data contains text.

In certain embodiments, case data visualization application 310 can filter a display of the one or more events associated with a case. Case data visualization application 310 can filter the display of the one or more events based on one or more tags, where the user can select one or more tags, and case data visualization application 310 can display only the events that are associated with at least one tag. Case data visualization application 310 can filter the one or more events based on one or more full-text indexes, where a user can enter one or more words, and case data visualization application 310 can display only the events that contain at least one word.

According to certain embodiments, case data visualization application 310 can facilitate coordination of case data with another case data visualization application. In general, there may be specific barriers to two or more organizations collaborating. For example, a law enforcement organization may have data related to a grand jury proceeding that cannot be shared with outside organizations. However, a private sector organization may work with the law enforcement organization, and may have data that is related to the grand jury proceeding, and that is mutually beneficial to both organizations. Although the private sector organization may be willing to share its data with the law enforcement organization, there may be legal and bureaucratic reasons why the organization's data cannot be commingled into a single database. Case data visualization application 310 can facilitate such coordination without commingling the two organizations' data. According to the embodiments, a case data visualization application for a first organization (such as case data visualization application 310) can distill criteria (such as a set of search terms and/or tags) into a criteria file. The criteria file can be loaded into a case data visualization application for a second organization. The case data visualization application for the second organization can correlate criteria distilled within the criteria file with case data stored within the case data visualization application for the second application. The correlation can produce one or more correlation results. Correlation results from the correlation can be filtered by the case data visualization for the second organization to remove any personal or confidential information. The filtered correlation results can be displayed within a user interface or stored within a file. For example, the filtered correlation results could include a list of one or more contacts, where each contact is associated with case data, but the case data is filtered, so that only contact information is returned.

In certain embodiments, where the case data visualization application is a reader format, the case data visualization application can disable the ability to edit the case data.

Figure 4:
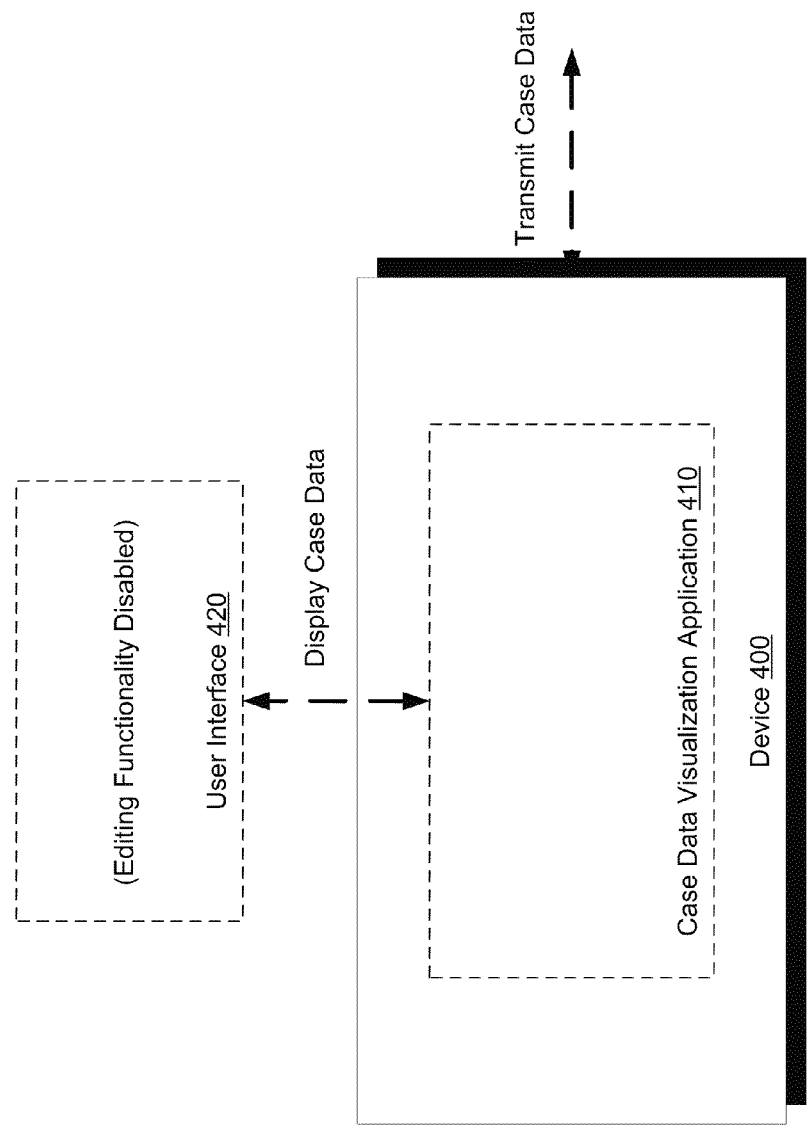
FIG. 4 illustrates a block diagram of a case data visualization application in a reader format in accordance with an embodiment of the invention.

FIG. 4 illustrates a block diagram of a case data visualization application in a reader format in accordance with an embodiment of the invention. According to the embodiment, a device 400 can include a case data visualization application 410 that is a reader format, where the case data visualization application 410 is implemented on device 400. Case data visualization application 410 can perform the functionality described in relation to case data visualization application 310, but case visualization application 410 can disable the ability to edit case data. For example, case data visualization application 410 can disable the ability to create new events. As another example, case data visualization application 410 can disable the ability to add one or more files to case data visualization application 410 to be encapsulated into a case file. In certain embodiments, editing features normally displayed within user interface 420 (such as a button for creating a new event or adding one or more files) are "grayed out," (i.e., are displayed with a gray field over them) and do not provide any functionality to a user (i.e., cannot be accessed by the user to perform any functionality). In other embodiments, the editing features normally displayed within user interface 420 are removed. In this manner, case data visualization application 410 can be distributed to third parties, without any risk of contamination of the case data stored within case data visualization application 410.

Figure 5:
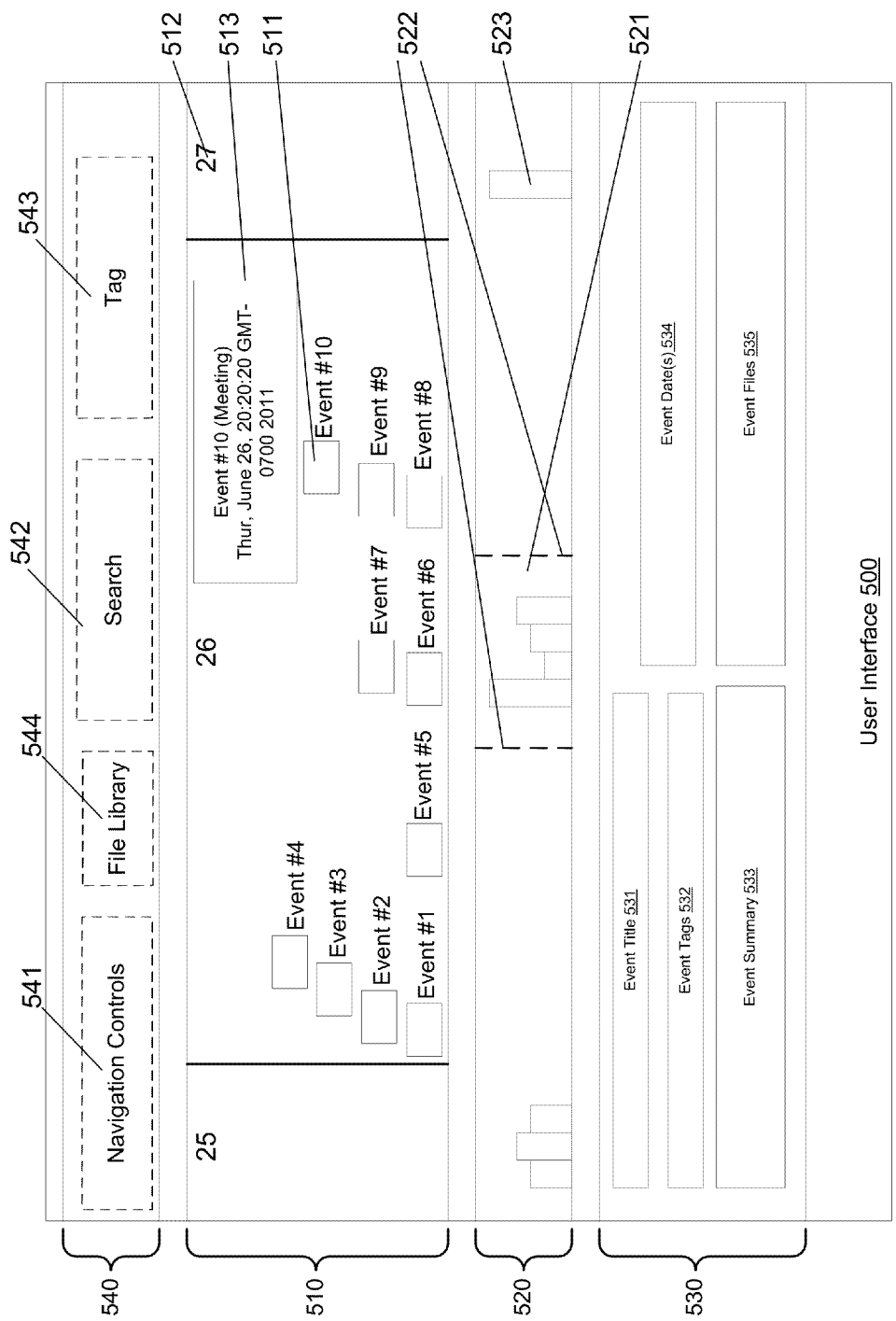
FIG. 5 illustrates an example user interface of a case data visualization module, according to an embodiment of the invention.

FIG. 5 illustrates an example user interface 500 of a case data visualization module, according to an embodiment of the invention. In one embodiment of the invention, user interface 500 is a default view presented to a user upon initiation of the case data visualization application.

According to the illustrated embodiment of FIG. 5, user interface 500 includes detail band 510. Detail band 510 displays case data associated with a case. More specifically, according to an embodiment, detail band 510 displays a view, such as a view of a timeline (i.e., timeline view), where one or more events that are associated with the case are displayed along the timeline, where each event of the one or more events includes case data. In one embodiment, detail band 510 only displays a portion of the timeline, and thus, only displays a portion of the one or more events. According to the embodiment, the portion of the timeline that is displayed within detail band 510 is determined by focus window 521 of time band navigator 520, as is described below in greater detail.

Furthermore, according to the embodiment, the portion of the timeline that is displayed within detail band 510 can be adjusted by a user, through the user "clicking" within detail band 510 and "scrolling" in a horizontal direction (with the computer mouse, for example) to a new position within the timeline. As another example, a user can adjust the portion of the timeline that is displayed within detail band 510 by "touching" within detail band 510 where detail band is displayed on a touchscreen and "swiping" in a horizontal direction (with a finger for example) to a new position within the timeline. Through the "scrolling" in the horizontal direction to a new position within the timeline, within detail band 510, detail band 510 adjusts the timeline view so that a portion of the timeline that corresponds to the new position is displayed within detail band 510. The "scrolling" in the horizontal direction, within detail band 510, also causes time band navigator 520 to adjust the position of focus window 521 displayed within time band navigator 520 to correspond to the new position, as is also described below in greater detail. In one embodiment, when a user "clicks" within detail band 510 and "scrolls" in a horizontal direction, detail band 510 displays a date and/or time that corresponds to a point within detail band 510. In one embodiment, this point is the center point of detail band 510.

In the illustrated embodiment of FIG. 5, detail band 510 displays ten events 511 associated with a case (entitled "Event #1," "Event #2," "Event #3," "Event #4," "Event #5," "Event #6," "Event #7," "Event #8," "Event #9," and "Event #10," respectively). One of ordinary skill in the art would readily appreciate that this is merely an example embodiment, and that in alternate embodiments, detail band 510 can display any number of events, where each event can be of any type. In the illustrated embodiment, each event is also associated with a specific date and/or time. However, in alternate embodiments, an event can be associated with a span of time, rather than a specific date and/or time. According to the illustrated embodiment, detail band 510 displays events 511 using a "stacking algorithm." A stacking algorithm is a display algorithm that generally displays events within the timeline that is displayed within detail band 510 in a horizontal direction, from left to right, based on a date and/or time corresponding to the event. According to the stacking algorithm, a subsequent event is displayed to the right of a preceding event in a horizontal direction, when the duration amount between the preceding event and the subsequent event is greater than or equal to a predetermined amount. This predetermined amount can be determined based on the screen size of detail band 510, and can dynamically be adjusted when the screen size of detail band 510 is adjusted. However, when the duration amount between the subsequent event and the preceding event is less than a predetermined amount, the stacking algorithm not only displays the subsequent event to the right of the preceding event in a horizontal direction, but also displays the subsequent event above the preceding event in a vertical direction. In other words, the stacking algorithm "stacks" the subsequent event on top of the preceding event vertically as well as horizontally.

An example of a stacking algorithm is illustrated in FIG. 5. According to the illustrated embodiment, detail band 510 displays events 511 using a stacking algorithm. According to the stacking algorithm, events 511 entitled "Event #1," "Event #2," "Event #3," and "Event 4," are "stacked" vertically, as well as horizontally, as the duration amount between the events are less than the predetermined amount. In contrast, event 511 entitled "Event #5" is not "stacked" vertically upon event 511 entitled "Event #4" because the duration amount between the events is greater than or equal to the predetermined amount. Instead, event 511 entitled "Event #5" is merely displayed to the right of event 511 entitled "Event #4," in a horizontal direction. Similarly, events 511 entitled "Event #6," and "Event #7" are stacked vertically, as well as horizontally, and events 511 entitled "Event #8," "Event #9," and "Event #10," are stacked vertically, as well as horizontally, whereas event 511 entitled "Event #8" is merely displayed to the right of events 511 entitled "Event #6" and "Event #7," in an horizontal direction. As illustrated in FIG. 5, the stacking algorithm displays a subsequent event at the bottom of the timeline when the duration amount between the preceding event and the subsequent event is greater than or equal to a predetermined amount, no matter where the preceding event was displayed with respect to the timeline.

According to an embodiment, detail band 510 also displays one or more time increments that the timeline can be divided into. In the illustrated embodiment of FIG. 5, detail band 510 displays time increments 512, where each time increment 512 represents a day. One of ordinary skill in the art would readily appreciate that time increments 512 are only examples of time increments, and that a time increment can be any duration of time, such as a second, a minute, an hour, a day, a week, a month, and a year. Furthermore, in one embodiment, time increments 512 are determined by detail band 510 based on a size of a display within detail band 510, and detail band 510 can dynamically adjust time increments 512 (for example, adjust time increments 512 from days to hours), based on a size adjustment of the display within detail band 510. A size adjustment of the display within detail band 510 is described below in greater detail.

In one embodiment, by "hovering" (for example, with a computer mouse) over an event displayed within detail band 510, such as event 511, detail band 510 displays a "tooltip" that includes case data associated with the event. In one embodiment, the case data includes a date and/or time of the event. In another embodiment, the case data also includes a link to a case file associated with the event. In the illustrated embodiment of FIG. 5, by hovering over event 511 entitled "Event #10," detail band 510 displays tooltip 513 associated with event 511. According to the illustrated embodiment, tooltip 513 includes a date and time of event 511 (i.e., "Thurs, June 26, 20:20:20 GMT-0700 2011).

In an embodiment, a user can "click" on an event, such as event 511 illustrated in FIG. 5, to highlight the event. According to the embodiment, a user can navigate to a subsequent event. In one example, a user can navigate to the subsequent event by "clicking" on a button (not shown in FIG. 5) displayed within user interface 500. According to an embodiment, the user can also navigate to a preceding event. In one example, a user can navigate to the preceding event by "clicking" on another button (also not shown in FIG. 5). In one embodiment, the subsequent event (or preceding event) is the first event that occurs after (or before) the highlighted event. In another embodiment, the subsequent event (or preceding event) is a "context-specific" event, and thus, is the first event that occurs after (or before) the highlighted event that also has an event type that is identical to the highlighted event. In another embodiment, when a user highlights an event by "clicking" on the event, detail band 510 can identify that the highlighted event is part of a sequence of events, and can also highlight the one or more events that are part of the sequence. For example, if a user highlights event 511, detail band 510 can identify that event 511 is part of a plurality of events, and can also highlight the other events.

According to the illustrated embodiment of FIG. 5, user interface 500 also includes time band navigator 520. Time band navigator 520 displays a complete range of a timeline. Time band navigator 520 includes focus window 521. Focus window 521 is a highlighted portion of time band navigator 520, and corresponds to a portion of the timeline that is displayed within detail band 510. Focus window 521 includes handles 522. Because focus window 521 corresponds to the portion of the timeline displayed within detail band 510, the left handle of handles 522 corresponds to the left boundary of detail band 510, and the right handle of handles 522 corresponds to the right boundary of detail band 510. A user can "click" on a handle of handles 522 and "drag" the handle in a horizontal direction. By "dragging" one of handles 522 in a horizontal direction, the user can increase or decrease the size of focus window 521. When the size of focus window 521 is increased or decreased, detail band 510 dynamically updates its display to correspond to the size of focus window 521. In one embodiment, as previously described, one or more time increments displayed within detail band 510 can be dynamically updated when the display of detail band 510 is dynamically updated (which can be based on an adjustment of the size of focus window 521).

Furthermore, according to the embodiment, a position of focus window 521 within a timeline can be adjusted by a user, through the user "clicking" within focus window 521 and "scrolling" in a horizontal direction to a new position within the timeline. Through the "scrolling" in the horizontal direction to a new position, within focus window 521, time band navigator 520 adjusts the position of focus window 521 within the timeline accordingly. The "scrolling" in the horizontal direction, within focus window 521, also causes detail band 510 to adjust the timeline view so that a portion of the timeline that corresponds to the new position is displayed within detail band 510. In one embodiment, when a user "clicks" within focus window 521 and "scrolls" in a horizontal direction, detail band 510 displays a date and/or time that corresponds to a point within detail band 510. In one embodiment, this point is the center point of detail band 510. In another embodiment, when a user "clicks" within time band navigator 520, detail band 510 adjusts the timeline view so that a portion of the timeline that corresponds to the position that the user "clicked" within time band navigator 520 is displayed within detail band 510.

In one embodiment, time band navigator 520 also displays one or more histograms, where each histogram indicates a relative frequency of events within the timeline. In the illustrated embodiment of FIG. 5, time band navigator 520 displays histograms 523, where histograms 523 each represent a relative frequency of events within the timeline. According to an embodiment, histograms 523 can be used to determine where to adjust a position of focus window 522.

According to the illustrated embodiment of FIG. 5, user interface 500 also includes event detail 530. According to an embodiment of the invention, when a user "clicks" on an event displayed within detail band 510, event detail 530 displays associated details of the event. In certain embodiments, such details includes a title of the event (displayed within event title 531), one or more tags associated with the event (displayed within event tags 532), a summary associated with the event (displayed within event summary 533), one or more dates associated with the event (displayed within event date(s) 534) and one or more files associated with the event (displayed within event files 535). In certain embodiments, a user can associate one or more tags with the event from within event tags 532, and can remove one or more associated tags from within event tags 532. In certain embodiments, the one or more dates include a single date associated with the event, where the single date is displayed within event date(s) 534. In other embodiments, the one or more dates include a start date associated with the event, and an end date associated with the event, where the start date and the end date are each displayed within event date(s) 534. In certain embodiments, a user can "click" on one or more files displayed within event files 535, and user interface 500 will display the corresponding file (not shown in FIG. 5).

According to the illustrated embodiment of FIG. 5, user interface 500 also includes filter/navigation bar 540. Filter/navigation bar 540 allows a user to navigate between, and filter, the one or more events displayed within user interface 500. For example, according to the embodiment, filter/navigation bar 540 includes navigation controls 541, search filter 542, tag filter 543, and file library 544. File library 544 is described in greater detail in relation to FIG. 6.

Navigation controls 541 include controls for navigating between different events. Such controls can include a sidebar that displays a sidebar within user interface 500 (not shown), where the sidebar includes additional aspects of a case, such as a detailed overview of the case, author of a case, and case sharing information. Such controls can also include a previous button and a next button that allow a user to navigate to a previous event and a next event within detail band 510, respectively. Such controls can also include a new event button that allows a user to create a new event, and delete a current event, respectively.

Search filter 542 allows a user to enter text, such as one or more words. According to an embodiment, a search filter can be applied so that the transaction data visualization application only displays events that are associated with the text (e.g., associated with at least one word of the one or more words), or highlights associated events so they are more prominently displayed on the timeline.

Tag filter 543 allows a user to select one or more tags. According to an embodiment, a tag filter can be applied so that the transaction data visualization application only displays events that are associated with at least one of the selected tags.

In certain embodiments, where the case data visualization application is a mobile format, the case data visualization application can be configured to execute on a mobile device, such as a mobile phone or a smartphone (e.g., Apple iPhone® or Google Android® device) or a tablet device (e.g., Apple iPad®).

FIG. 6 illustrates an example file library user interface 600 of a case data visualization module, according to an embodiment of the invention. In certain embodiments, file library user interface 600 can be displayed when a user "clicks" on file library 544 of user interface 500 illustrated in FIG. 5. According to the embodiment, file library user interface 600 displays a view of one or more files that have been received by the case data visualization application. According to the illustrated embodiment of FIG. 6, file library user interface 600 includes file filter 610. File filter 610 can filter the files that are displayed within file library user interface 600. In certain embodiments, file filter 610 can filter the files based on one of three filter settings, "All," "Attached," and "Unattached." When file filter 610 filters the files based on the filter setting "All," all the files that have been received by the case data visualization application are displayed within file library user interface 600. When file filter 610 filters the files based on the filter setting "Attached," only files that have been associated with an event are displayed within file library user interface 600. When file filter 610 filters the files based on the filter setting "Unattached," only files that have not been associated with an event are displayed within file library user interface 600. In certain embodiments, each file can be associated with more than one event.

According to the embodiment, file library user interface 600 includes file view 620. File view 620 can control the view that is used to display the files within file library user interface 600. In certain embodiments, file view 620 can select one of two views: "Normal" and "Forensic." The "Normal" view displays a list of the files received by the case data visualization application. The "Forensic" view displays a list of the files, where the files are categorized by their forensic hash. In other words, two or more files with identical forensic hashes are grouped within a single category.

According to the illustrated embodiment of FIG. 6, file library user interface 600 also includes the following fields: file name 630, events 640, size 650, and create date 660. For each file, file name 630 displays the file name, events 640, displays the number of events that the file is associated with, size 650 displays the size of the file, and create date 660 displays the date the file was created. In certain embodiments, where a user "clicks" on a number of events that the file is associated with, displayed within events 640, file library user interface 600 displays a list of events that the file is associated with (not shown in FIG. 6). In some of these embodiments, by "clicking" on one of the events within the list of events, detail band 510 of user interface 500 of FIG. 5 navigates to the event and displays the event (not shown in FIG. 6). As previously described, in certain embodiments, a case data visualization application can automatically forensically hash each received file. Thus, the case data visualization application can determine that a received file is identical to a file that has already been received. In these embodiments, rather storing the received file a second time, the case data visualization application can create metadata that references the file that has already been received, and can store the metadata, rather than the received file.

In the illustrated embodiment, file library user interface 600 displays three files, files 670, 680, and 690. File library user interface 600 further displays the name of the file, the number of events that the file is associated with, the size of the file and the date the file was created, for each file of files 670, 680, and 690. However, one of ordinary skill in the art would readily appreciate that this is merely an example embodiment, and that in alternate embodiments, file library user interface 600 can display any number of files.

Figure 7:
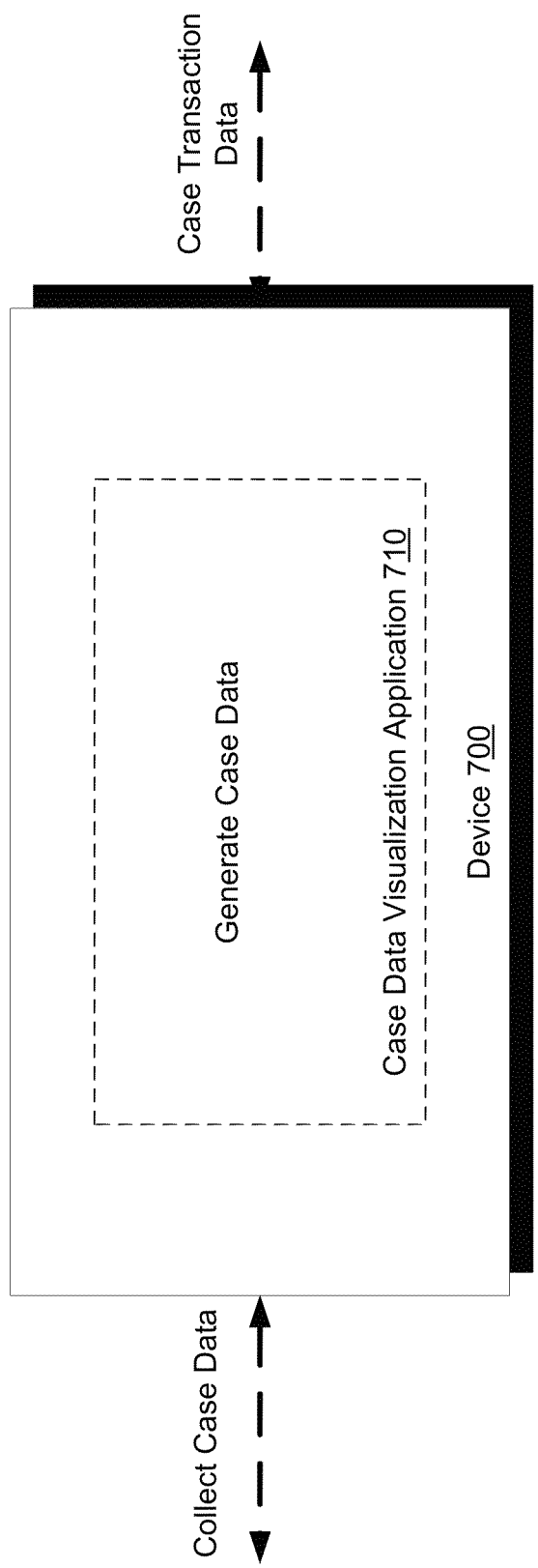
FIG. 7 illustrates a block diagram of a case data visualization application in a mobile format in accordance with an embodiment of the invention.

FIG. 7 illustrates a block diagram of a case data visualization application in a mobile format in accordance with an embodiment of the invention. According to the embodiment, a device 700 can include a case data visualization application 710 that is a mobile format, where the case data visualization application 710 is implemented on device 700. In some embodiments, device 700 is a mobile device, and in other embodiments, device 700 is a tablet device. Case data visualization application 710 can further generate case data. Examples of case data can include image data, audio data, video data, visualization data, geospatial data, or document data. For example, case data visualization application 710 can interface with a camera stored within device 700 and collect one or more images or videos. Each image or video can be stored in an image file or video file respectively. As another example, case data visualization application 710 can interface with a global positioning system ("GPS") receiver stored within device 700 and collect geospatial data, where the geospatial data can be recorded as metadata for collected files. As yet another example, case data visualization application 710 can generate a digital document, where the digital document can be stored in a document file. Case data visualization application 710 can then transmit the generated case data to another device, such as a client or server.

According to certain embodiments, case data visualization application 710 can encrypt the case data before it is transmitted to another device. Also, in certain embodiments, case data visualization application 710 can automatically forensically hash the case data upon creation time.

According to certain embodiments, case data visualization application 710 can transmit the case data in one of several ways. In some embodiments, case data visualization application 710 can transmit the case data wirelessly over an encrypted channel. In other embodiments, case data visualization application 710 can establish a point-to-point connection with the other device and transmit the case data over the point-to-point connection. In certain embodiments, the point-to-point connection can be a peer-to-peer wireless connection. In these embodiments, the peer-to-peer connection can be established using a zero configuration network discovery protocol. As one of ordinary skill in the art would readily appreciate, a zero configuration network discovery protocol is a protocol that allows one device to locate and connect to another device automatically, without manually configuring either device's network settings. Also, in these embodiments, an authentication mechanism can be required to establish the point-to-point connection. For example, case data visualization application 710 can transmit an authentication key (such as a personal identification number) to the other device. A user can be required to enter the authentication key within a user interface of the other device, before case data visualization application 710 will initiate the transfer of the case data over the peer-to-peer connection.

In other embodiments, case data visualization application 710 can store the case data within a file, where the file can be physically transferred to the other device, and synchronized with any case data stored within the other device. In yet other embodiments, case data visualization application 710 can store the case data on a network, where the other device can fetch the case data from the network.

In certain embodiments, where the case data visualization application is a server format, the case data visualization application can facilitate collaboration on cases.

Figure 8:
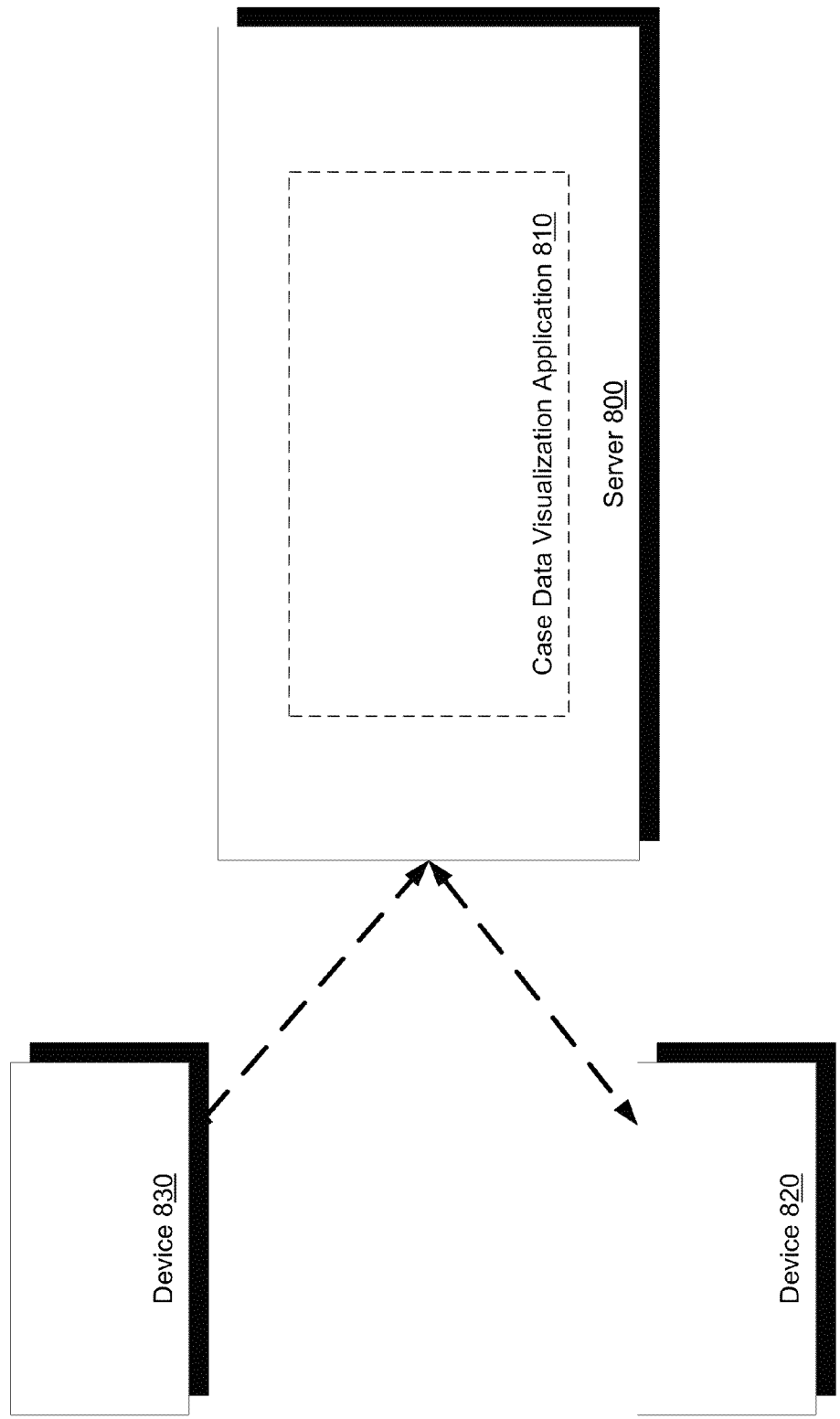
FIG. 8 illustrates a block diagram of a case data visualization application in a server format in accordance with an embodiment of the invention.

FIG. 8 illustrates a block diagram of a case data visualization application in a server format in accordance with an embodiment of the invention. According to the embodiment, a server 800 can include a case data visualization application 810 that is a server format, where the case data visualization application 810 is implemented on device 800. According to the embodiment, case data visualization application 810 can facilitate collaboration on cases. More specifically, case data visualization application 810 can "publish" case data associated with a case, so that other users (using a device that includes a client format of the case data visualization application, such as devices 820 and 830) can access the case data. Other users can access the case data by downloading the case data using a device that includes the client format of the case data visualization application (such as devices 820 and 830). Through this collaboration, changes to cases can propagate to other users. In other embodiments, case data visualization application 810 can act as gateway, where the case data visualization application can connect to other products, services, or capabilities.

Also in certain embodiments, case data visualization application 810 can synchronize a received set of case data with a stored set of case data that is stored within case data visualization application 810. Case data visualization application 810 can synchronize the two sets of data so that other users can view changes to the case data included in the received set of case data. Thus, during synchronization, case data visualization application 810 can reconcile differences between the received set of case data and the stored set of case data. In some embodiments, the received set of case data has a different format than the stored set of case data. In these embodiments, during synchronization, case data visualization application 810 can first transform the received set of case data into the format of the stored set of case data before reconciling the differences. For example, the received set of case data may originally have a SQLite format, the stored set of case data may have a MongoDB format, and case data visualization application 810 can transform the received set of case data so that the received set of case data can also have a MongoDB format.

Thus, according to certain embodiments, a client format of the case data visualization application can disconnect from case data visualization application 810, go offline, reconnect with case data visualization application 810, and can synchronize its case data with the case data of case data visualization application 810, where case data visualization application 810 facilitates the synchronization. The advantage of this type of synchronization mechanism is that no connectivity of the client format of the case data visualization application is assumed. Instead, a user can work on a case file using a first client format of the case data visualization application, the case file can be moved from one physical location to another physical location, loaded onto a second client format of the case data visualization application, and can be synchronized with case data visualization application 810.

In certain embodiments, synchronization is initiated manually by a user. In other embodiments, synchronization is automatically initiated. In certain embodiments, case data visualization application 810 can store case data within a NoSQL database, such as a MongoDB database.

According to certain embodiments, case data visualization application 810 can facilitate coordination of case data with another case data visualization application. According to the embodiments, a case data visualization application for a first organization (such as case data visualization application 810) can distill criteria (such as a set of search terms and/or tags) into a criteria file. The criteria file can be loaded into a case data visualization application for a second organization (such as a case data visualization application implemented on device 820 or device 830). The case data visualization application for the second organization can correlate criteria distilled within the criteria file with case data stored within the case data visualization application for the second application. The correlation can produce one or more correlation results. Correlation results from the correlation can be filtered by the case data visualization for the second organization to remove any personal or confidential information. The filtered correlation results can be displayed within a user interface or stored within a file. For example, the filtered correlation results could include a list of one or more contacts, where each contact is associated with case data, but the case data is filtered, so that only contact information is returned.

Figure 9:
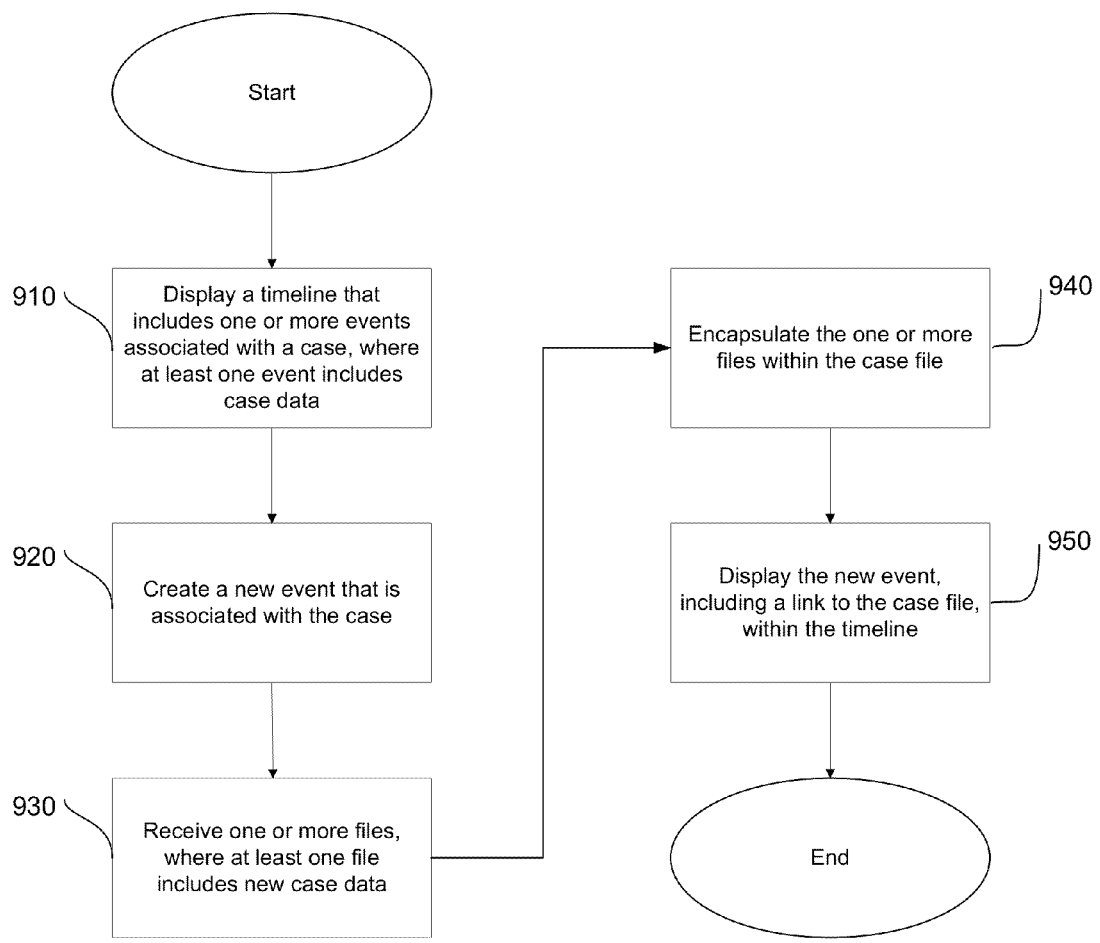
FIG. 9 illustrates a method according to an embodiment of the invention.

FIG. 9 illustrates a method according to an embodiment of the invention. The steps of each method and algorithm described in connection with the embodiments disclosed herein may be embodied directly in hardware, in a computer program executed by a processor, or in a combination of the two. A computer program may be embodied on a computer-readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components.

The flow begins and then proceeds to step 910. At step 910, a timeline is displayed that includes one or more events associated with a case. The one or more events can be displayed within the timeline in a chronological order. In certain embodiments, each event of the one or more events is associated with a date and/or time. In certain embodiments, at least one event is associated with a timespan. Also, in certain embodiments, the one or more events can be displayed along the timeline using a stacking algorithm. A stacking algorithm displays two events in a horizontal direction when a duration amount between the two events is greater than or equal to a predetermined amount. The stacking algorithm also displays two events in a horizontal direction and a vertical direction when the duration amount between the two events is less than the predetermined amount. In certain embodiments, the case can be a prosecution of a criminal defendant. Also, in certain embodiments, the case data can include at least one of image data, audio data, video data, visualization data, geospatial data or document data. The flow then proceeds to step 890.

At step 920, a new event is created that is associated with the case. In certain embodiments, summary information can also be associated with the event. Summary information can include at least one of a date and/or time, or a title. The flow then proceeds to step 930.

At step 930, one or more files are received, where at least one file includes new case data. New case data is case data that is not part of the case data included with the one or more events that are displayed within the timeline. In certain embodiments, the new case data can include at least one of image data, audio data, video data, visualization data, geospatial data or document data. Also in certain embodiments, the one or more files are selected from a user interface that can be displayed, where the user interface allows one or more files that are stored on a device to be selected. In these embodiments, a folder can also be selected from the user interface, where the folder includes the one or more files. The flow then proceeds to step 940.

At step 940, the one or more files are encapsulated within a case file. In certain embodiments, a case file is created, where the case file is a file that is associated with the case, that has a specifically defined format, and that includes case data. In these embodiments, the one or more files are stored within the case file. In certain embodiments, the specifically defined format is a SQLite file format. Also, in certain embodiments where at least one file is identical to a file that is already stored within the case filed, metadata associated with the at least file is generated and stored within the case file. The flow then proceeds to step 950.

At step 950, the new event is displayed within the timeline. The displayed new event can include a link to the case file, where the link to the case file causes the new case data to be displayed within the timeline. The flow then ends.

In certain embodiments, the method illustrated in FIG. 9 includes one or more additional optional steps. In some embodiments, the one or more files can be automatically forensically hashed. The automatic forensic hashing can include hashing each file to produce a digital signature and embedding the digital signature within the file. In other embodiments, the one or more files can be encrypted. In some embodiments, one or more tags can be associated with the new event. In other embodiments, one or more timespan events can also be associated with the case.

In certain embodiments, the case file can be stored within a SQLite database. In other embodiments, the display of the timeline can be switched to a view of one or more case files associated with the one or more events. In some embodiments, an ability to edit the case data displayed within the timeline can be disabled. In other embodiments, the case data can be generated, where the case data comprises at least one of, image data, audio data, video data, visualization data, geospatial data, or document data.

In certain embodiments, the case data can be transmitted to a device. In some of these embodiments, the case data can be transmitted over an encrypted channel. In other of these embodiments, the case data can be transmitted over a peer-to-peer wireless connection.

In certain embodiments, at least one search term or tag can be stored within a criteria file. This criteria file can then be correlated with case data stored within an application. The correlation can produce one or more correlation results. Correlation results from the correlation can be filtered by the case data visualization for the second organization to remove any personal or confidential information.

Figure 10:
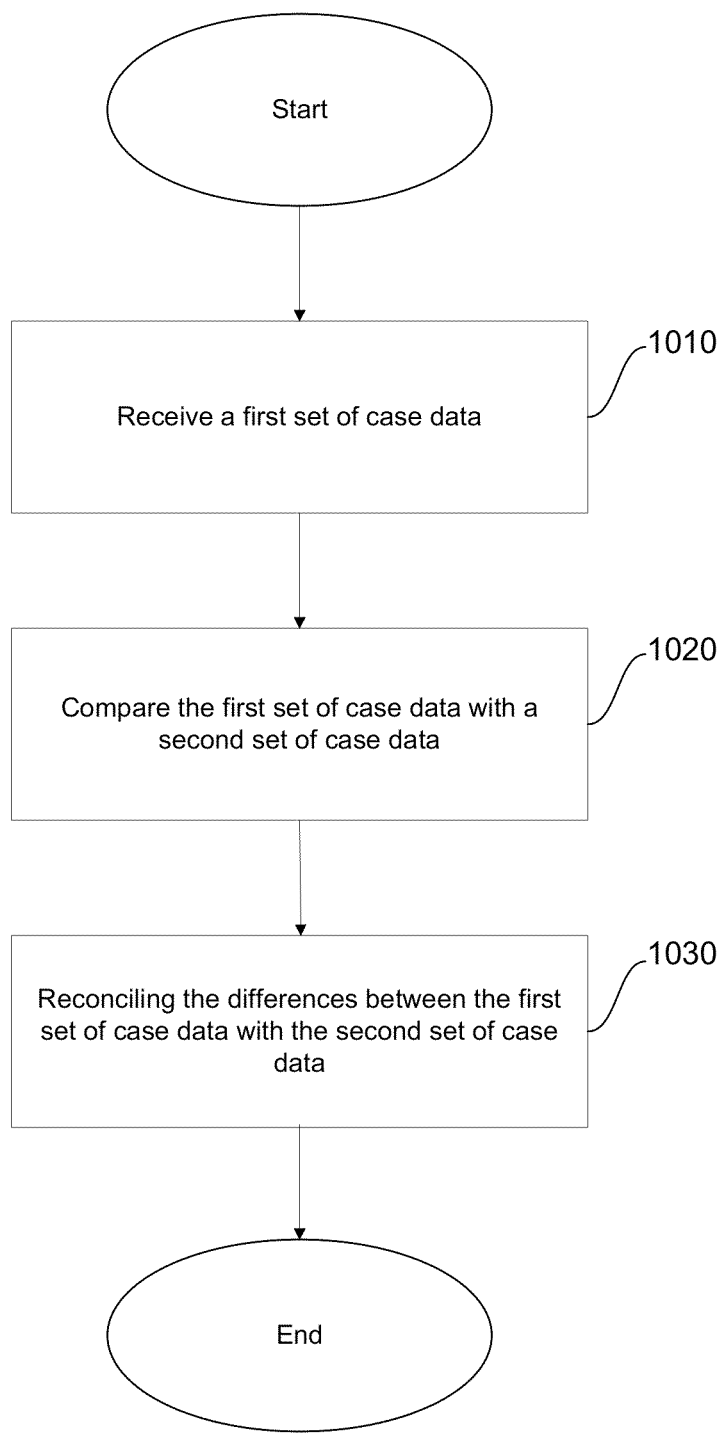
FIG. 10 illustrates another method, according to an embodiment of the invention.

FIG. 10 illustrates another method, according to an embodiment of the invention. The flow begins and then proceeds to step 1010. At step 1010, a first set of case data associated with a case is received. The first set of case data includes a first set of events associated with the case. The flow then proceeds to step 1020. At step 1020, the first set of case data is compared with a second set of case data associated with the case, wherein the second set of case data includes a second set of events associated with the case. The flow then proceeds to step 1030. At step 1030, one or more differences between the first set of case data with the second set of case data are reconciled. The flow then ends.

In certain embodiments, the reconciliation of the one or more differences is initiated by a user. In these embodiments, the user can select how to reconcile the differences. For example, the user can select to retain the first set of case data for all differences. As another example, the user can select to retain the second set of case data for all differences. As yet another example, the user can select to retain either the first set of case data or the second set of case data on a difference-by-difference basis for each difference. In other embodiments, the reconciliation is automatic, where the automatic reconciliation is based on one or more pre-defined conditions. In some embodiments, the first set of case data is stored in a SQLite database, and the second set of case data is stored in a NoSQL database. In some of these embodiments, the NoSQL database is a MongoDB database. In certain embodiments, the first set of case data is in a first format, the second set of case data is in a second format, and the first format of the first set of case data can be transformed into the second format.

According to certain embodiments, a data visualization application can provide a streamlined, intuitive, software application, that can receive digital files and documents (such as digital photos, audio samples, scanned documents, and digital video), and organize it in a manner that is easy to visualize. The data visualization application can also allow a user to focus on a wide band of time or a narrow band of time, and can view one or more events associated with a case, as well as the underlying case data (such as digital files and documents) for each event.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    displaying a plurality of different view types for visualizing a case that comprises one or more events associated with the case, wherein the one or more events are displayed in a chronological order in at least one of the plurality of different view types, and wherein at least one event comprises case data;
    creating a new event that is associated with the case;
    receiving one or more files, wherein at least one file comprises new case data;
    encapsulating the one or more files within a case file; and
    displaying the new event within the plurality of different view types, wherein the displayed new event comprises a link to the case file, and wherein the link to the case file causes the new case data to be displayed within the plurality of different view types, wherein the plurality of different view types comprises at least two of a timeline view, a spatial map view, a tabular grid view, or a relational link chart view, and wherein the displaying the plurality of view types further comprises displaying the one or more events in at least one of the plurality of view types using a stacking algorithm, where the stacking algorithm displays two events in a horizontal direction when a duration amount between the two events is greater than or equal to a predetermined amount, and where the stacking algorithm displays two events in a horizontal direction and a vertical direction when the duration amount between the two events is less than the predetermined amount.

2. The method of claim 1, further comprising automatically forensically hashing the one or more files.

3. The method of claim 2, wherein the automatically forensically hashing further comprises hashing each file to produce a digital signature and embedding the digital signature within the file.

4. The method of claim 1, wherein the encapsulating the one or more files further comprises storing the one or more files within the case file.

5. The method of claim 4, where the encapsulating the one or more files further comprises generating metadata associated with at least one file of the one or more files when the at least one file is identical to a file that is stored within the case file.

6. The method according to claim 1, further comprising associating one or more tags with the new event.

7. The method according to claim 1, further comprising displaying one or more timespan events associated with the case.

8. The method according to claim 1, further comprising encrypting the one or more files.

9. The method according to claim 1, wherein a format of the case file comprises a SQLite file format.

10. The method according to claim 1, further comprising storing the case file within a SQLite database.

11. The method according to claim 1, further comprising:
storing at least one search term or tag within a criteria file; and
correlating the criteria file with case data stored within an application.

12. The method according to claim 1, further comprising switching the display of the plurality of different view types to a view of one or more case files associated with the one or more events.

13. The method according to claim 1, further comprising disabling the ability to edit the case data.

14. The method according to claim 1, further comprising generating the case data, wherein the case data comprises at least one of, image data, audio data, video data, visualization data, geospatial data, or document data.

15. The method according to claim 14, further comprising transmitting the case data to a device.

16. The method according to claim 15, wherein the transmitting the case data further comprises transmitting the data over an encrypted channel.

17. The method according to claim 15, wherein the transmitting the case data further comprises transmitting the data over a peer-to-peer wireless connection.

18. An apparatus, comprising:
a memory configured to store a case data visualization module; and
a processor configured to execute the case data visualization module stored on the memory;
wherein the processor is further configured, when executing the case data visualization module stored on the memory, to,
display a plurality of different view types for visualizing a case that comprises one or more events associated with the case, wherein the one or more events are displayed in a chronological order in at least one of the plurality of different view types, and wherein at least one event comprises case data;
create a new event that is associated with the case;
receive one or more files, wherein at least one file comprises new case data;
encapsulate the one or more files within a case file; and
display the new event within the plurality of different view types, wherein the displayed new event comprises a link to the case file, and wherein the link to the case file causes the new case data to be displayed within the plurality of different view types,
wherein the plurality of different view types comprises at least two of a timeline view, a spatial map view, a tabular grid view, or a relational link chart view, and
wherein the displaying the plurality of view types further comprises displaying the one or more events in at least one of the plurality of view types using a stacking algorithm, where the stacking algorithm displays two events in a horizontal direction when a duration amount between the two events is greater than or equal to a predetermined amount, and where the stacking algorithm displays two events in a horizontal direction and a vertical direction when the duration amount between the two events is less than the predetermined amount.

19. The apparatus according to claim 18, wherein the processor is further configured, when executing the case data visualization module stored on the memory, to disable the ability to edit the case data.

20. The apparatus according to claim 18, wherein the processor is further configured, when executing the case data visualization module stored on the memory, to generate the case data, wherein the case data comprises at least one of, image data, audio data, video data, or geospatial data.

21. The apparatus according to claim 19, wherein the processor is further configured, when executing the case data visualization module stored on the memory, to transmit the case data to a device.

22. A non-transitory computer-readable medium, having a computer program stored thereon that, when executed by a processor, causes the processor to implement a method, the method comprising:
displaying a plurality of different view types for visualizing a case that comprises one or more events associated with the case, wherein the one or more events are displayed in a chronological order in at least one of the plurality of different view types, and wherein at least one event comprises case data;
creating a new event that is associated with the case;
receiving one or more files, wherein at least one file comprises new case data;
encapsulating the one or more files within a case file; and
displaying the new event within the plurality of different view types, wherein the displayed new event comprises a link to the case file, and wherein the link to the case file causes the new case data to be displayed within the plurality of different view types, wherein the plurality of different view types comprises at least two of a timeline view, a spatial map view, a tabular grid view, or a relational link chart view, and wherein the displaying the plurality of view types further comprises displaying the one or more events in at least one of the plurality of view types using a stacking algorithm, where the stacking algorithm displays two events in a horizontal direction when a duration amount between the two events is greater than or equal to a predetermined amount, and where the stacking algorithm displays two events in a horizontal direction and a vertical direction when the duration amount between the two events is less than the predetermined amount.

23. The non-transitory computer-readable medium according to claim 22, the method further comprising disabling the ability to edit the case data.

24. The non-transitory computer-readable medium according to claim 22, the method further comprising generating the case data, wherein the case data comprises at least one of, image data, audio data, video data, or geospatial data.

25. The non-transitory computer-readable medium according to claim 24, the method further comprising transmitting the case data to a device.

26. The method of claim 1, further comprising:
receiving a first set of case data associated with a case, wherein the first set of case data comprises a first set of events associated with the case;
comparing the first set of case data with a second set of case data associated with the case, wherein the second set of case data comprises a second set of events associated with the case; and
reconciling one or more differences between the first set of case data with the second set of case data,
wherein the reconciling comprises implementing at least one of a plurality of different reconciliation options to reconcile the one or more differences between the first set of case data with the second set of case data, and
wherein the case corresponds to at least one of a prosecution of a criminal defendant, a medical examination of a specific condition or a set of symptoms, or a unit of work for a specific profession.

27. The method of claim 26, wherein a user can select how to reconcile the one or more differences.

28. The method of claim 26, wherein the reconciling of the one or more differences is initiated by a user.

29. The method of claim 26, wherein the reconciling is automatic.

30. The method of claim 26, wherein the second set of case data is stored in a NoSQL database.

31. The method of claim 26, wherein the first set of case data is in a first format, wherein the second set of case data is in a second format, the method further comprising transforming the first format of the first set of case data into the second format.

32. The apparatus of claim 18, wherein the processor is further configured, when executing the case data visualization module stored on the memory, to,
receive a first set of case data associated with a case, wherein the first set of case data comprises a first set of events associated with the case;
compare the first set of case data with a second set of case data associated with the case, wherein the second set of case data comprises a second set of events associated with the case; and
reconcile one or more differences between the first set of case data with the second set of case data,
wherein reconciling comprises implementing at least one of a plurality of different reconciliation options to reconcile the one or more differences between the first set of case data with the second set of case data, and
wherein the case corresponds to at least one of a prosecution of a criminal defendant, a medical examination of a specific condition or a set of symptoms, or a unit of work for a specific profession.

33. The apparatus of claim 32, wherein the first set of case data is in a first format, wherein the second set of case data is in a second format, wherein the processor is further configured, when executing the case data visualization module stored on the memory, to transform the first format of the first set of case data into the second format.

34. The non-transitory computer-readable medium of claim 22, the method further comprising:
receiving a first set of case data associated with a case, wherein the first set of case data comprises a first set of events associated with the case;
comparing the first set of case data with a second set of case data associated with the case, wherein the second set of case data comprises a second set of events associated with the case; and
reconciling one or more differences between the first set of case data with the second set of case data,
wherein the reconciling comprises implementing at least one of a plurality of different reconciliation options to reconcile the one or more differences between the first set of case data with the second set of case data, and
wherein the case corresponds to at least one of a prosecution of a criminal defendant, a medical examination of a specific condition or a set of symptoms, or a unit of work for a specific profession.

35. The non-transitory computer-readable medium of claim 34, wherein the first set of case data is in a first format, wherein the second set of case data is in a second format, the method further comprising transforming the first format of the first set of case data into the second format.

36. The method of claim 1, wherein one of the plurality of view types comprises a timeline view.

* * * * *